Sept. 20, 1927.
H. W. O'DOWD
1,643,223
WATER HEATING SYSTEM
Filed Sept. 23, 1925
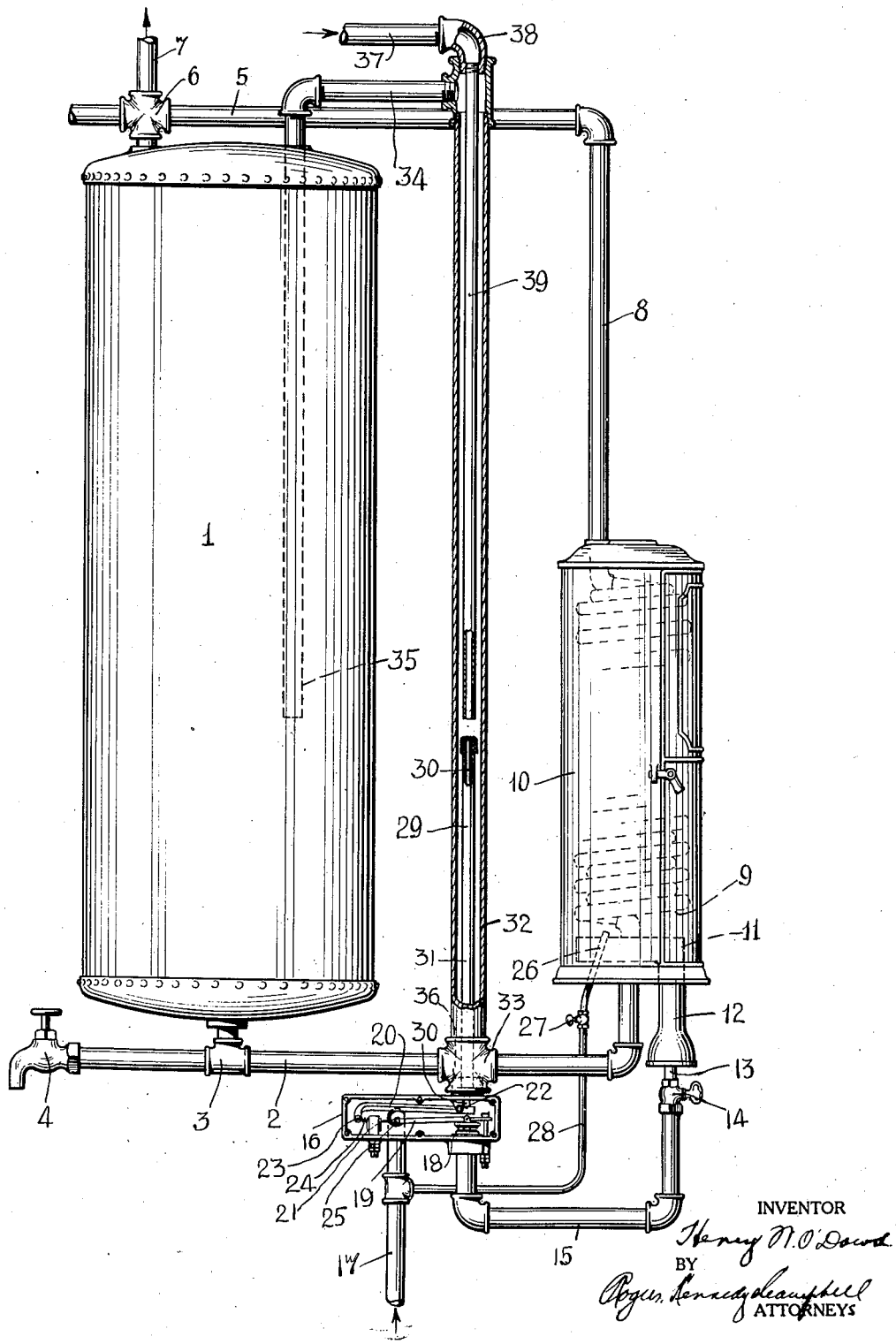
INVENTOR
Henry W. O'Dowd
BY
Rogers, Kennedy & Campbell
ATTORNEYS Patented Sept. 20, 1927.

1,643,223

UNITED STATES PATENT OFFICE.

HENRY W. O'DOWD, OF JERSEY CITY, NEW JERSEY, ASSIGNOR TO STANDARD GAS EQUIPMENT CORPORATION, A CORPORATION OF MARYLAND.

WATER-HEATING SYSTEM.

Application filed September 23, 1925. Serial No. 58,213.

This invention relates to water heating systems and more particularly to those of the closed circulating type embodying a hot water storage tank. The general object of the invention is to provide a heating system of this kind with automatic thermostatic control located outside of the storage tank and which will act to maintain a plentiful supply of hot water on hand at all times. In carrying out the invention, the apparatus has been so designed that parts of standard heating systems now in use may be utilized in large measure, although this feature, while advantageous, is not of course essential. In many systems now in use, it is customary to locate the thermostatic controlling elements directly in the storage tank at some suitable point. This arrangement not only requires special fittings, but renders it difficult to gain access to the thermostatic elements for adjustment or repair, and, moreover, the temperature and quantity of hot water in storage cannot be as accurately regulated as desired.

In the improved system contemplated by this invention, the thermostat is located outside of the storage tank and besides being readily accessible for adjustment or repair, is so arranged that it will respond quickly to temperature changes and maintain a predetermined quantity of hot water in the storage tank. In the preferred embodiment illustrated, the thermostat is located in a pipe which is connected at its lower end to the water circulating pipe at a point between the storage tank and the heating coil, and at its upper end it is provided with a branch pipe extending downwardly within the tank to a predetermined level below the top thereof, which level may be varied as desired, depending upon the quantity of hot water to be maintained within the storage tank. The construction and operation of the parts will best be understood from the detailed description to follow, although it may be noted at this point that it is proposed to employ for the water heating coil a gas burner controlled by the thermostat through a snap-action valve, that is to say, a valve which is thrown by the thermostat to a fully open or a fully closed position in regulating the supply of fuel to the burner. The improved system, therefore, possesses the advantages of a heater of the instantaneous type as well as those of a heater of the storage type, the hot water furnished instantaneously by the heating coil in conjunction with the hot water stored in the tank providing an ample supply.

The accompanying drawing illustrates a water heating system constructed in accordance with the invention, some of the parts being shown in section and others broken away, to expose the interior construction.

The storage tank 1, may be of any suitable form or construction, that shown being of a conventional type used for household or similar purposes. Leading from and to the tank is a water circulating pipe comprising a lower horizontal portion 2 or return pipe connected to the bottom of the tank by a T-fitting 3 and provided with a drainage faucet 4, and a flow pipe comprising an upper horizontal portion 5 connected to the top of the tank by a suitable fitting 6, which latter also provides for the connection to the tank of an outlet or hot water pipe 7, and a connected vertical portion 8, the said circulating pipe including a water heating unit or coil 9, to which the return and flow pipes are connected all in the usual way. The water heating coil 9 is enclosed, as customary, in a jacket or casing 10 containing in its lower portion a main heating Bunsen burner 11, of any well-known type. Gas is supplied to the burner 11 through its mixing tube 12 from a nozzle 13 (having a shut-off valve 14) provided at the end of an outlet pipe 15 leading from a valve box 16 having a suitable inlet pipe 17.

Located within the box 16 is a snap-action valve mechanism comprising a valve proper 18 and two multiplying levers 19 and 20. The lever 19 is of the third order, being fulcrumed at 21 and carrying near its free end the valve 18, while the lever 20 is of the first order, being pivoted at 22 with its shorter arm in position to be acted upon by a thermostat and having its longer arm turned downwardly at its free end and connected at 23 to one end of a strong contractile spring 24, whose other end is connected to the lever 19 at an intermediate point 25. As the parts are thus arranged, when the lever 20 is actuated in one direction, the line of pull of the spring 24 will pass above the fulcrum point 21 and lift the lever 19 so as to locate the valve 18 in the fully open position, as shown in the drawing; whereas, when the lever 20 is actuated in the opposite direction, the line of pull of the spring will pass beneath the fulcrum point 21 and depress the lever 19 so as to locate the valve in its fully closed position. The valve mechanism thus described forms the subject of a co-pending application Serial No. 63,060 and per se constitutes no part of the present invention, which contemplates any form of snap-action valve suitable for the purpose.

A pilot burner 26, which may be of any suitable form, is associated with the main heating burner 11 and is supplied with gas under the control of a hand valve 27 by a pipe 28 branching off from the inlet pipe 17 above referred to.

Coming now to the invention, the snap valve mechanism above described is controlled in its action, that is to say, the valve 18 is thrown to fully open or fully closed position, by means of a thermostat 31 of any approved form or construction and which is located in a vertical pipe 32. This thermostat pipe 32 is connected at its lower end by a suitable fitting 33 to the lower portion 2 of the water circulating pipe at a point between the storage tank 1 and the heating coil 9, and at its upper end it is provided with a branch pipe comprising a short section 34 extended horizontally above the tank and a vertical open-ended section 35 extended downwardly within the tank to a level only slightly above a horizontal plane touched by the upper end of the thermostat. The valve box 16 is also connected to the pipe fitting 33 by a screw plug 36 to which the thermostat 31 is attached and through which it actuates the valve mechanism. While, as above stated, the thermostat may be of any approved form or construction, it is herein shown as comprising (as the positive or expanding element) an outer copper tube 29 closed at its upper end and screwed at its lower end into the plug 36, and (as the negative or non-expanding element) an internal nickel-steel rod 30 connected to the upper end of the copper tube and projecting through the plug 36 into the casing 16 for engagement with the shorter arm of the multiplying lever 20. It hardly needs to be stated that when the thermostat is acted upon by cold water in the pipe 32 it will contract and throw the snap valve to its fully open position for supplying gas to the Bunsen burner, and that when the thermostat is acted upon by hot water in the pipe 32, it will expand and throw the snap valve to its fully closed position for shutting off the supply of gas to the Bunsen burner, it being understood that the temperature of the hot water may be regulated as desired by the adjustment of the valve mechanism.

Cold water is supplied to the system through an inlet pipe 37 connected to the upper end of the thermostat pipe 32 by an elbow fitting 38 and having a smaller section 39 extending downwardly within the thermostat pipe to a level adjacent the upper end of the thermostat and approximately the level at which the branch pipe section 35 terminates within the storage tank.

The operation of the parts will now be clear: Cold water is drawn in through the inlet pipe 37 and discharged into the pipe 32 for direct contact with the contained thermostat 31. It then passes down the thermostat pipe 32 and enters the lower portion 2 of the water circulating pipe, part flowing in one direction into the storage tank and part flowing in the opposite direction to the heating coil 9. Initially, of course, and when the gas is shut off by the hand valve 14, the cold water will entirely fill the system and submerge the thermostat 31 in the pipe 32, thus causing the snap valve 18 to occupy its fully open position. When, now, the gas is turned on by opening the valve 14 and the main Bunsen burner 11 lighted by the pilot 26, the water in the heating coil 9 becomes heated and sets up a circulation through the system. The hot water enters the tank at the top through the fitting 6 and will, of course, gradually work its way down into the tank, displacing the cold water as it descends during the circulation. This action will continue until the hot water reaches the level at which the pipe section 35 terminates within the storage tank, at which time the hot water will back up or rise within the section 35 and enter the thermostat pipe 32, flowing down the same and submerging the thermostat 31 in whole or in part. Inasmuch as the hot water has reached the proper temperature, it will cause the thermostat to expand and throw the snap valve to its fully closed position, thus shutting off the gas supply and interrupting the operation of the main heating burner. Attention is called to the fact that, due to the provision of the downwardly extending pipe section 35 within the storage tank, no hot water is allowed to enter the thermostat pipe 32 until it reaches the level at which the pipe section 35 terminates within the tank, the cold water up to that time acting as a seal for the open end of the pipe section and preventing the entrance of the hot water. In this way, a predetermined volume of hot water may be maintained within the storage tank at all times. As will be obvious, the length of the pipe section 35 may be varied as desired, depending upon the volume of hot water to be kept in storage. The hot water is drawn off through the outlet pipe 7, which is, as above described, connected by the fitting 6 to both the tank and the upper or discharge portion 5 of the water circulating pipe. Upon the drawing off of the hot water, cold water will of course be drawn in through the inlet pipe 37 and enter the system in the manner above noted, acting upon the thermostat almost instantly to place the main heating burner again in operation and rising within the storage tank to reseal the open end of the pipe section 35 against the admission of hot water into the thermostat pipe 32. When the drawing off of the hot water ceases, the gas burner will continue in operation until the hot water again reaches its predetermined volume within the storage tank and is allowed to re-enter the thermostat pipe and shut off the gas supply. It will be seen that, under normal conditions of use, the operations become largely intermittent, cold water being drawn in and heated as hot water is drawn off, although there is always in reserve within the storage tank an extra volume of hot water at the desired temperature to supplement that supplied instantaneously by the heating coil 9 and which may be great enough to answer all demands made upon the system.

Many advantages characterize the improved system: As will be understood, standard heating systems now in use and lacking the automatic control may be converted into automatic systems with slight alterations and at little expense, no special fittings being necessary and the storage tank being left substantially intact. The thermostatic control mechanism, being located entirely outside of the tank, is readily accessible for repair or adjustment, and moreover, is quickly responsive to temperature changes and functions effectively to maintain the hot water at the desired temperature with little or no variation. The location of the thermostat in the outside pipe is particularly advantageous in providing for a reserve supply of hot water, a feature which is especially desirable when the capacity of the heating coil is relatively small. When the capacity of the heating coil is small, its heating efficiency is correspondingly large and at the same time a considerable economy is effected in the fuel consumed by the gas burners. These and various other advantages will be readily appreciated by those skilled in the art.

In its broader aspects, the invention is not, of course, confined to the particular embodiment herein shown and described, as many changes and modifications may be resorted to without departing from the spirit of the invention and without sacrificing its chief advantages. For instance, the thermostat pipe might be connected directly to the storage tank at its lower end, rather than to the water circulating pipe, the essential idea being to have it communicate at different levels below the top thereof, so as to provide for the predetermined volume of hot water within the tank. Again, the cold water inlet pipe might be connected to the system other than through the medium of the thermostat pipe. Furthermore, while a gas burner is especially suitable, a heating appliance of some other kind, as for example an electrical unit, might be associated with the water heating coil of the circulating pipe. It should be understood, therefore, that the invention is not limited to any specific form or embodiment, except in so far as such limitations are specified in the claims.

Having thus described my invention, its construction and mode of operation, what I claim and desire to secure by Letters Patent of the United States is as follows:

1. In a water heating system, the combination of a storage tank, a circulating pipe leading from and to the tank and including a water heating unit, and comprising a flow pipe leading from the heating unit to the tank and a return pipe leading from the tank to the heating unit, a heating appliance associated with said unit, a thermostat controlling the action of the heating appliance, and a pipe containing the thermostat and communicating at its lower end with the bottom portion of the tank and provided at its other end with a branch pipe independent of the said flow pipe and extended downwardly into the tank to a predetermined level below the top of the same.

2. In a water heating system, the combination of a storage tank, a circulating pipe leading from and to the tank and including a water heating unit, and comprising a flow pipe leading from the heating unit to the tank and a return pipe leading from the tank to the heating unit, a heating appliance associated with said unit, a thermostat controlling the action of the heating appliance, and a pipe containing the thermostat and communicating at one end with the return pipe and communicating at the other end independently of the said flow pipe directly with the storage tank at a predetermined level below the top of the same.

3. In a water heating system, the combination of a storage tank, a circulating pipe leading from and to the tank and including a water heating unit, and comprising a flow pipe leading from the heating unit to the tank and a return pipe leading from the tank to the heating unit, a heating appliance associated with said unit, a thermostat controlling the action of the heating appliance, a pipe containing the thermostat and communicating at its lower end with the bottom portion of the tank and provided at its other end with a branch pipe independent of the said flow pipe and extended downwardly into the tank to a predetermined level below the top of the same, and a water inlet pipe connected to the thermostat pipe and communicating with the storage tank through the medium of said branch pipe and the return pipe.

4. In a water heating system, the combination of a storage tank, a circulating pipe leading from and to the tank and including a water heating unit, a heating appliance associated with said unit, a thermostat controlling the action of the heating appliance, a pipe containing the thermostat and communicating at one end with the circulating pipe at a point between the storage tank and heating unit and communicating at the other end directly with the storage tank at a predetermined level below the top of the same, and a water inlet pipe extended downwardly within the thermostat pipe and communicating therewith at a level adjacent the upper end of the thermostat.

5. In a water heating system, the combination of a storage tank, a circulating pipe leading from and to the tank and including a water heating unit, a heating appliance associated with said unit, a thermostat controlling the action of the heating appliance, and a pipe containing the thermostat and connected at its lower end directly to the water circulating pipe at a point between the storage tank and the heating unit and provided at its upper end with a branch pipe extended downwardly within the storage tank and communicating therewith independently of the circulating pipe at a predetermined level below the top of the same.

6. In a water heating system, the combination of a storage tank, a circulating pipe leading from and to the tank and including a water heating unit, a heating appliance associated with said unit, a thermostat controlling the action of the heating appliance, a pipe containing the thermostat and connected at its lower end directly to the water circulating pipe at a point between the storage tank and the heating coil and provided at its upper end with a branch pipe extended downwardly within the storage tank and communicating therewith at a predetermined level below the top of the same, and a water inlet pipe extended downwardly within the thermostat pipe and communicating therewith at a level approximately the same as that at which the branch pipe communicates with the storage tank.

7. In a water heating system, the combination of a storage tank, a circulating pipe leading from and to the tank and including a water heating unit, and comprising a flow pipe leading from the heating unit to the tank and a return pipe leading from the tank to the heating unit, a gas burner associated with said unit, connections for supplying gas to the burner including a valve adapted to occupy a fully open or a fully closed position, a thermostat acting instantly to move said valve to one position or the other, and a pipe containing the thermostat and communicating at its lower end with the bottom portion of the tank and provided at its other end with a branch pipe independent of the said flow pipe and extended downwardly into the tank to a predetermined level below the top of the same.

8. In a water heating system, the combination of a storage tank, a circulating pipe leading from and to the tank and including a water heating unit, and comprising a flow pipe leading from the heating unit to the tank and a return pipe leading from the tank to the heating unit, a gas burner associated with said unit, connections for supplying gas to the burner including a valve adapted to occupy a fully open or a fully closed position, a thermostat acting instantly to move said valve to one position or the other, and a pipe containing the thermostat and communicating at one end with the return pipe and communicating at the other end independently of the flow pipe directly with the storage tank at a predetermined level below the top of the same.

9. In a water heating system, the combination of a storage tank, a circulating pipe leading from and to the tank and including a water heating unit, and comprising a flow pipe leading from the heating unit to the tank and a return pipe leading from the tank to the heating unit, a gas burner associated with said unit, connections for supplying gas to the burner including a valve adapted to occupy a fully open or a fully closed position, a thermostat acting instantly to move said valve to one position or the other, a pipe containing the thermostat and communicating at its lower end with the bottom portion of the tank and provided at its other end with a branch pipe independent of the flow pipe and extended downwardly into the tank to a predetermined level below the top of the same, and a water inlet pipe connected to the thermostat pipe and communicating with the storage tank through the medium of said thermostat pipe and the return pipe.

10. In a water heating system, the combination of a storage tank, a circulating pipe leading from and to the tank and including a water heating unit, a gas burner associated with said unit, connections for supplying gas to the burner including a valve adapted to occupy a fully open or a fully closed position, a thermostat acting instantly to move said valve to one position or the other, a pipe containing the thermostat and communicating at one end with the circulating pipe at a point between the storage tank and heating unit and communicating at the other end directly with the storage tank at a predetermined level below the top of the same, and a water inlet pipe extended downwardly within the thermostat pipe and communicating therewith at a level adjacent the upper end of the thermostat.

11. In a water heating system, the combination of a storage tank, a circulating pipe leading from and to the tank and including a water heating unit, a gas burner associated with said unit, connections for supplying gas to the burner including a valve adapted to occupy a fully open or a fully closed position, a thermostat acting instantly to move said valve to one position or the other, and a pipe containing the thermostat and connected at its lower end directly to the water circulating pipe at a point between the storage tank and the heating coil and provided at its upper end with a branch pipe extended downwardly within the storage tank and communicating therewith independently of the circulating pipe at a predetermined level below the top of the tank.

12. In a water heating system, the combination of a storage tank, a circulating pipe leading from and to the tank and including a water heating unit, a gas burner associated with said unit, connections for supplying gas to the burner including a valve adapted to occupy a fully open or a fully closed position, a thermostat acting instantly to move said valve to one position or the other, a pipe containing the thermostat and connected at its lower end directly to the water circulating pipe at a point between the storage tank and the heating unit and provided at its upper end with a branch pipe extended downwardly within the storage tank and communicating therewith at a predetermined level below the top of the same, and a water inlet pipe extended downwardly within the thermostat pipe and communicating therewith at a level approximately the same as that at which the branch pipe communicates with the storage tank.

13. In a water heating system, the combination of a storage tank, a circulating pipe including a water heating unit, and comprising a flow pipe leading from the heating unit to the tank and a return pipe leading from the tank to the heating unit, a heating appliance associated with said unit, a thermostat controlling the action of the heating appliance, and a second circulating pipe containing the thermostat and communicating with the tank independently of the said flow pipe.

14. In a water heating system, the combination of a storage tank, a circulating pipe including a water heating unit, and comprising a flow pipe leading from the heating unit to the tank and a return pipe leading from the tank to the heating unit, a heating appliance associated with said unit, a thermostat controlling the action of the heating appliance, and a second circulating pipe containing the thermostat and communicating with the storage tank independently of the said flow pipe, respectively at different levels below the top of the tank.

15. In a water heating system, the combination of a storage tank, a circulating pipe including a water heating unit, and comprising a flow pipe leading from the heating unit to the tank and a return pipe leading from the tank to the heating unit, a gas burner associated with said unit, connections for supplying gas to the burner including a valve adapted to occupy a fully opened or a fully closed position, a thermostat acting instantly to move said valve to one position or the other, and a second circulating pipe containing the thermostat and communicating with the tank independently of the said flow pipe.

16. In a water heating system, the combination of a storage tank, a circulating pipe including a water heating unit, and comprising a flow pipe leading from the heating unit to the tank and a return pipe leading from the tank to the heating unit, a gas burner associated with said unit, connections for supplying gas to the burner including a valve adapted to occupy a fully opened or a fully closed position, a thermostat acting instantly to move said valve to one position or the other, and a pipe containing the thermostat and communicating with the storage tank independently of the said flow pipe, respectively at different levels below the top of the tank.

In testimony whereof, I have affixed my signature hereto.

HENRY W. O'DOWD.